US012719368B2

(12) United States Patent
Wang et al.

(10) Patent No.: US 12,719,368 B2
(45) Date of Patent: Aug. 25, 2026

(54) SWITCHING CONVERTER WITH ZERO-VOLTAGE SWITCHING AND CONTROL METHOD THEREOF

(71) Applicant: Chengdu Monolithic Power Systems Co., Ltd., Chengdu (CN)

(72) Inventors: Jicheng Wang, Hangzhou (CN); Guangzhuo Li, Hangzhou (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 223 days.

(21) Appl. No.: 18/762,250

(22) Filed: Jul. 2, 2024

(65) Prior Publication Data

US 2025/0096681 A1 Mar. 20, 2025

(30) Foreign Application Priority Data

Sep. 19, 2023 (CN) ........................ 202311214732.6

(51) Int. Cl.
*H02M 3/158* (2006.01)
*H02M 1/00* (2006.01)

(52) U.S. Cl.
CPC ......... *H02M 3/158* (2013.01); *H02M 1/0009* (2021.05); *H02M 1/0058* (2021.05)

(58) Field of Classification Search
CPC ... H02M 3/158; H02M 1/0009; H02M 1/0058
See application file for complete search history.

(56) References Cited

U.S. PATENT DOCUMENTS 9,083,245 B2 7/2015 Zhao et al.
9,130,473 B2 9/2015 Lin et al.
10,432,086 B1 * 10/2019 Kamath .................. H02M 7/12
10,630,168 B1 * 4/2020 Wang .................. H02M 1/4233
2014/0159693 A1 6/2014 Kuang et al.
2020/0014293 A1 * 1/2020 Zhang ..................... H02M 1/14
2022/0216802 A1 * 7/2022 Yan ....................... H02M 7/487
2022/0337152 A1 10/2022 Wang et al.
2023/0223855 A1 7/2023 Wang et al.
2024/0039389 A1 * 2/2024 Chen ................ H02M 3/33592
2024/0039417 A1 2/2024 Chen

* cited by examiner

*Primary Examiner* — Lakaisha Jackson
(74) *Attorney, Agent, or Firm* — Ashurst Perkins Coie US LLP

(57) ABSTRACT

A control method for a switching converter with a main switch and a sync switch and converting an AC (alternating current) input voltage into an output voltage. The control method includes the following steps. 1) Determining whether the switching converter works in DCM or CRM. 2) When the switching converter works in CRM, turning off the sync switch when a first time period started from the time when an inductor current decreases to zero expires. 3) Turning on the main switch at a valley of a voltage across the main switch. And 4) turning off the main switch when an on time of the main switch reaches a second time period, where the second time period is related to the first time period.

20 Claims, 9 Drawing Sheets

SWITCHING CONVERTER WITH ZERO-VOLTAGE SWITCHING AND CONTROL METHOD THEREOF

CROSS-REFERENCE TO RELATED APPLICATIONS

This application claims the benefit of CN application No. 202311214732.6, filed on Sep. 19, 2023, and incorporated herein by reference.

TECHNICAL FIELD OF THE INVENTION

The present invention generally relates to electronic circuits, and more particularly but not exclusively, to switching converters and associated control methods.

BACKGROUND OF THE INVENTION

Soft switching is widely used in switching converters to reduce switching loss and improve circuit efficiency. Traditionally, a power switch of a switching converter is turned on when a voltage across the power switch decreases to zero, thereby realizing zero-voltage switching. However, in some conditions such as an input voltage approaches an output voltage, the voltage across the power switch cannot decrease to zero, resulting in hard switching and large switching loss.

SUMMARY OF THE INVENTION

An embodiment of the present invention discloses a control circuit for a switching converter with a main switch and a sync switch and converting an AC (alternating current) input voltage into an output voltage. The control circuit includes a compensating circuit and a sync switch control circuit. The compensating circuit is configured to generate a compensating signal indicative of a first time period. The sync switch control circuit is configured to generate a sync switch control signal to control the sync switch based on the compensating signal. When the switching converter works in DCM (discontinuous conduction mode), the sync switch control circuit is configured to turn off the sync switch when an inductor current decreases to zero, to turn on the sync switch at a valley of a voltage across the sync switch and to turn off the sync switch again when an on time of the sync switch reaches the first time period.

An embodiment of the present invention discloses a switching converter for converting an AC input voltage into an output voltage. The switching converter includes a first power switch, a second power switch, an inductor, a third power switch, a fourth power switch, and a sync switch control circuit. The first power switch is coupled between an output node and a switching node. The second power switch is coupled between the switching node and a reference ground. The inductor is coupled between a first input node and the switching node. The third power switch is coupled between a second input node and the reference ground. The fourth power switch is coupled between the output node and the second input node. The sync switch control circuit is configured to generate a sync switch control signal to control a sync switch. When the switching converter works in DCM, the sync switch control circuit is configured to turn off the sync switch when an inductor current decreases to zero, to turn on the sync switch at a valley of a voltage across the sync switch and to turn off the sync switch again when an on time of the sync switch reaches a first time period. Where when the AC input voltage is in a positive half cycle, the first power switch is the sync switch; when the AC input voltage is in a negative half cycle, the second power switch is the sync switch.

An embodiment of the present invention discloses a control method for a switching converter with a main switch and a sync switch and converting an AC input voltage into an output voltage. The control method includes the following steps. 1) Determining whether the switching converter works in DCM or CRM. 2) When the switching converter works in CRM, turning off the sync switch when a first time period started from the time when an inductor current decreases to zero expires. 3) Turning on the main switch at a valley of a voltage across the main switch. And 4) turning off the main switch when an on time of the main switch reaches a second time period, where the second time period is related to the first time period.

BRIEF DESCRIPTION OF DRAWINGS

The present invention can be further understood with reference to the following detailed description and the appended drawings, wherein like elements are provided with like reference numerals.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Reference to "one embodiment", "an embodiment", "an example" or "examples" means: certain features, structures, or characteristics are contained in at least one embodiment of the present invention. These "one embodiment", "an embodiment", "an example" and "examples" are not necessarily directed to the same embodiment or example. Furthermore, the features, structures, or characteristics may be combined in one or more embodiments or examples. In addition, it should be noted that the drawings are provided for illustration and are not necessarily to scale. And when an element is described as "connected" or "coupled" to another element, it can be directly connected or coupled to the other element, or there could exist one or more intermediate elements. In contrast, when an element is referred to as "directly connected" or "directly coupled" to another element, there is no intermediate element.

Figure 1:
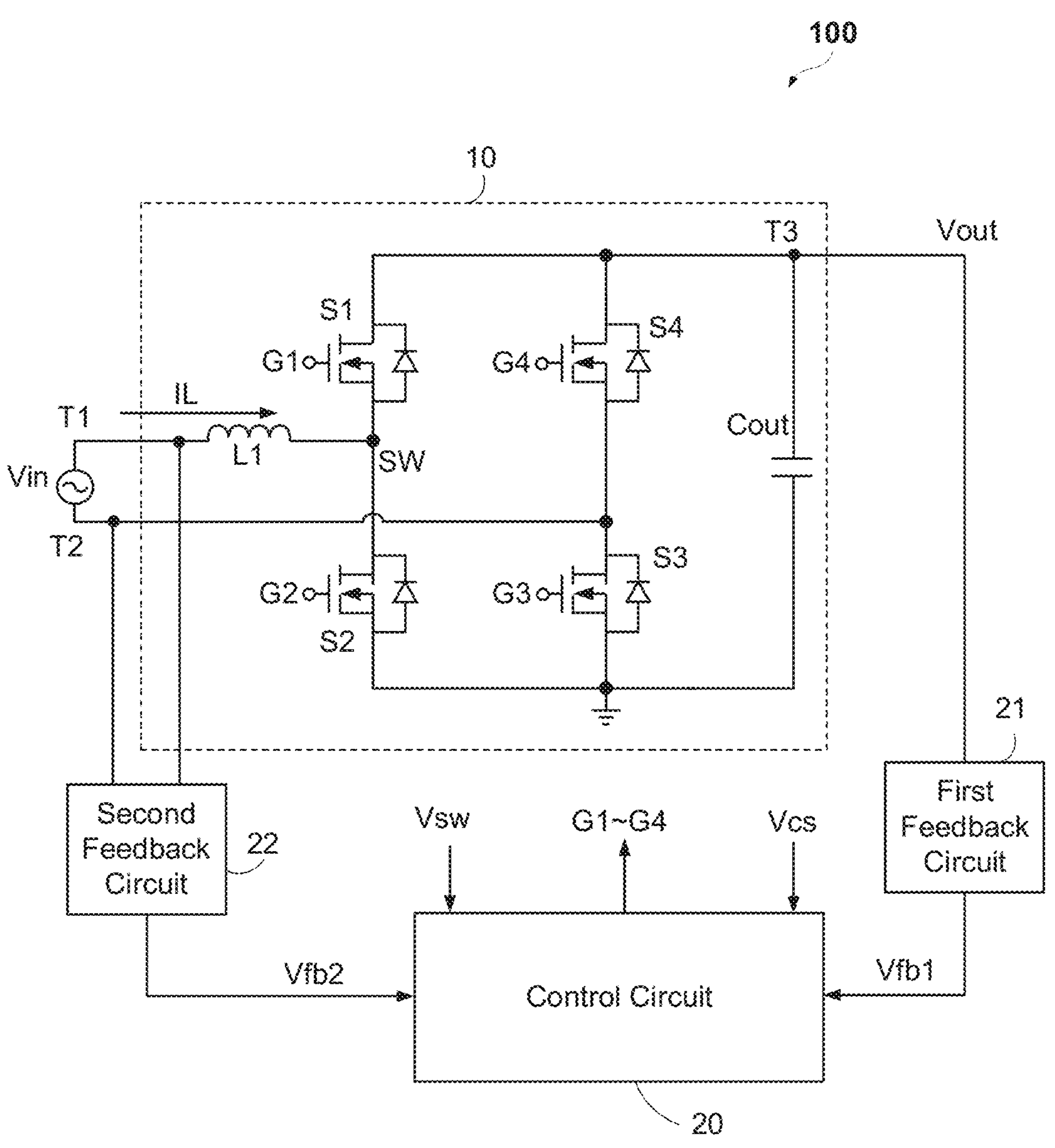
FIG. 1 illustrates a circuit schematic of a switching converter 100 in accordance with an embodiment of the present invention.

FIG. 1 illustrates a circuit schematic of a switching converter 100 in accordance with an embodiment of the present invention. As shown in FIG. 1, the switching converter 100 includes a switching circuit 10 and a control circuit 20. The switching circuit 10 includes an inductor L1, a first power switch S1, a second power switch S2, a third power switch S3, a fourth power switch S4 and an output capacitor Cout. The inductor L1 is coupled between a first input node T1 and a switching node SW. The first power switch S1 is coupled between an output node T3 and the switching node SW. The second power switch S2 is coupled between the switching node SW and a reference ground. The third power switch S3 is coupled between a second input node T2 and the reference ground. The fourth power switch S4 is coupled between the output node T3 and the second input node T2. The output capacitor Cout is coupled between the output node T3 and the reference ground. The positive direction of an inductor current IL is shown as FIG. 1. The switching circuit 10 converts an AC (alternating current) input voltage Vin into an output voltage Vout via the turning-on and the turning-off of the power switches S1~S4.

In the example shown in FIG. 1, when the AC input voltage Vin is in a positive half cycle, the third power switch S3 keeps on, the fourth power switch S4 keeps off, the first power switch S1 and the second power switch S2 turn on and off alternatively. The second power switch S2 is a main switch and the first power switch S1 is a sync switch. When the AC input voltage Vin is in a negative half cycle, the third power switch S3 keeps off, the fourth power switch S4 keeps on, the first power switch S1 and the second power switch S2 turn on and off alternatively. The first power switch S1 is the main switch and the second power switch S2 is the sync switch.

Those skilled in the art can understand that the main switch and the sync switch in the embodiments of the present invention are a pair of power switches turned on and off alternatively. When the main switch is turned on and the sync switch is turned off, an energy storage component (such as the inductor L1 shown in FIG. 1) of the switching converter stores energy. When the main switch is turned off and the sync switch is turned on, the energy storage component (such as the inductor L1 shown in FIG. 1) releases energy to an output terminal of the switching converter.

In one embodiment, the AC input voltage Vin is in the positive half cycle when the AC input voltage Vin is higher than a positive threshold voltage Vzero and the AC input voltage Vin is in the negative half cycle when the AC input voltage Vin is lower than a negative threshold voltage-Vzero. In one embodiment, the positive threshold voltage Vzero may approach zero but be higher than zero and the negative threshold voltage-Vzero may approach zero but be lower than zero.

The control circuit 20 is configured to receive a first feedback voltage signal Vfb1 indicative of the output voltage Vout, a second feedback voltage signal Vfb2 indicative of the AC input voltage Vin, a current sensing signal Vcs indicative of the inductor current IL, and a switching voltage Vsw at the switching node SW. And the control circuit 20 is configured to generate switch control signals G1~G4 to control the power switches S1~S4 based on the first feedback voltage signal Vfb1, the second feedback voltage signal Vfb2, the current sensing signal Vcs and the switching voltage Vsw.

The working principle of the switching converter 100 when the AC input voltage Vin is in the positive half cycle is similar to that when the AC input voltage Vin is in the negative half cycle. For clarity, the following illustration takes the positive half cycle as an example, where the second power switch S2 is the main switch and the first power switch S1 is the sync switch.

In the example shown in FIG. 1, when the AC input voltage Vin approaches the output voltage Vout, the control circuit 20 is configured to turn on the sync switch S1 for an additional first time period tcomp1 to generate a reverse current, which is used to discharge a parasitic drain-source capacitor of the main switch S2 to reduce the voltage across the main switch S2 to zero, thereby realizing zero-voltage switching of the main switch S2. This can reduce switching loss and improve efficiency.

In one embodiment, the first time period tcomp1 is related to the AC input voltage Vin, the output voltage Vout and a resonant cycle Ts of the voltage across the sync switch S1. In a further embodiment, the resonant cycle Ts can be obtained by detecting the resonant cycle of the switching voltage Vsw.

In the example shown in FIG. 1, the switching converter 100 further includes a first feedback circuit 21 and a second feedback circuit 22. The first feedback circuit 21 is configured to receive the output voltage Vout and to generate the first feedback voltage signal Vfb1 based on the output voltage Vout. The second feedback circuit 22 is configured to receive the AC input voltage Vin and to generate the second feedback voltage signal Vfb2 based on the AC input voltage Vin.

Figure 2:
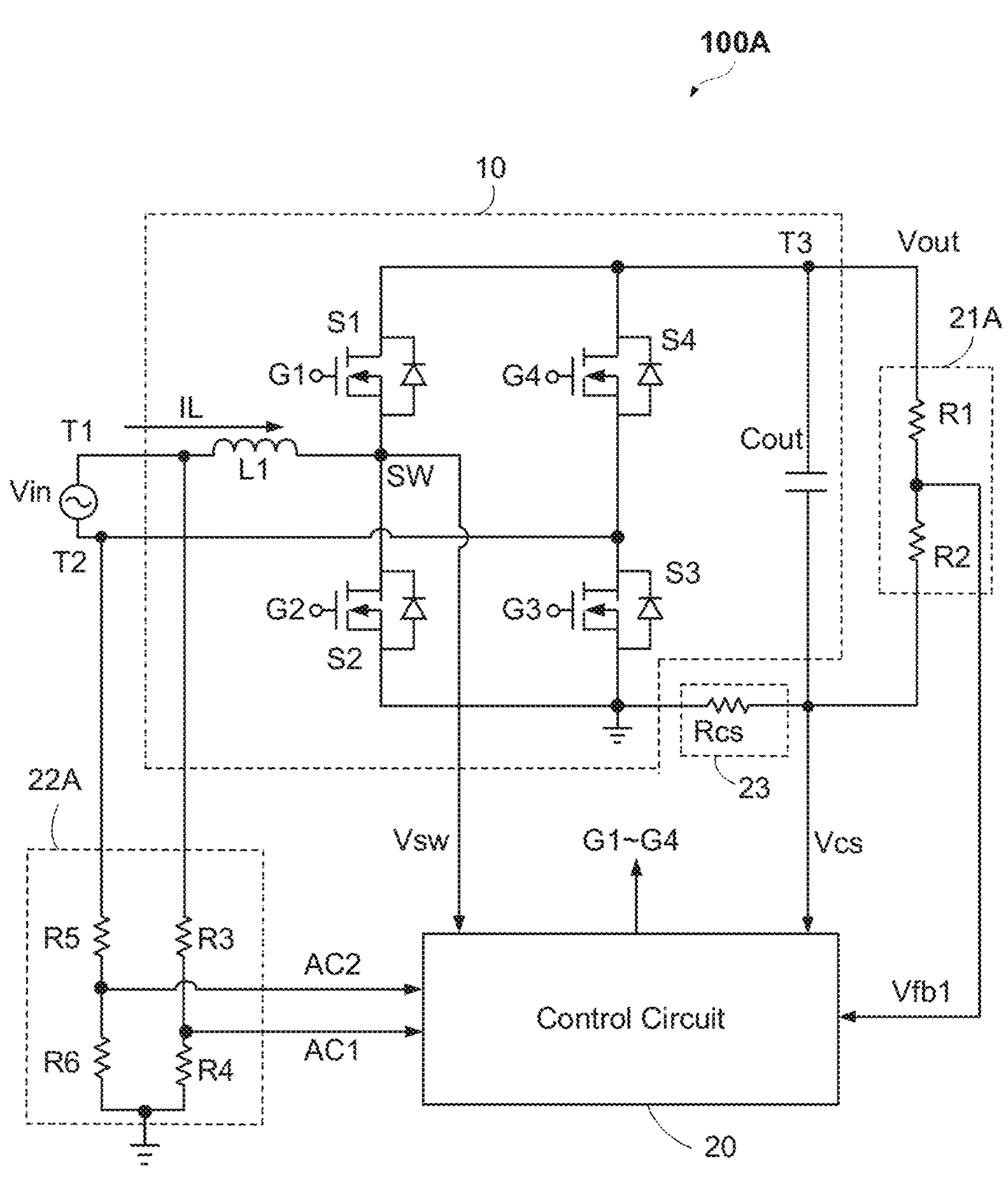
FIG. 2 illustrates a circuit schematic of a switching converter 100A in accordance with another embodiment of the present invention.

FIG. 2 illustrates a circuit schematic of a switching converter 100A in accordance with another embodiment of the present invention. As shown in FIG. 2, the first feedback circuit 21A includes resistors R1 and R2, where a common connection node of the resistors R1 and R2 provides the first feedback voltage signal Vfb1.

In the example shown in FIG. 2, the second feedback voltage signal Vfb2 includes a first voltage signal AC1 and a second voltage signal AC2. The second feedback circuit 22A includes resistors R3~R6, where a common connection node of the resistors R3 and R4 provides the first voltage signal AC1 and a common connection node of the resistors R5 and R6 provides the second voltage signal AC2. In another embodiment, the second feedback voltage signal Vfb2 can be obtained by further processing the first voltage signal AC1 and the second voltage signal AC2. For example, Vfb2=AC1−AC2=k*Vin.

In the example shown in FIG. 2, the switching converter 100A further includes a current sensing circuit 23 to provide the current sensing signal Vcs. As shown in FIG. 2, the current sensing circuit 23 includes a current sensing resistor Rcs coupled between the output capacitor Cout and the reference ground.

Those skilled in the art can understand that the first feedback circuit 21, the second feedback circuit 22 and the current sensing circuit 23 shown in above embodiments are used for illustration purpose, other suitable circuits can also be applicable here, as long as the generated signals can represent the output voltage Vout, the AC input voltage Vin and the inductor current IL respectively. In one embodiment, the first feedback circuit 21 and the second feedback circuit 22 can be omitted, then the first feedback voltage signal Vfb1 is the output voltage Vout itself and the second feedback voltage signal Vfb2 is the AC input voltage Vin itself. In one embodiment, the inductor current IL is equal to an input current of the switching circuit 10 and thus a signal indicative of the input current can also represent the inductor current IL.

Figure 3:
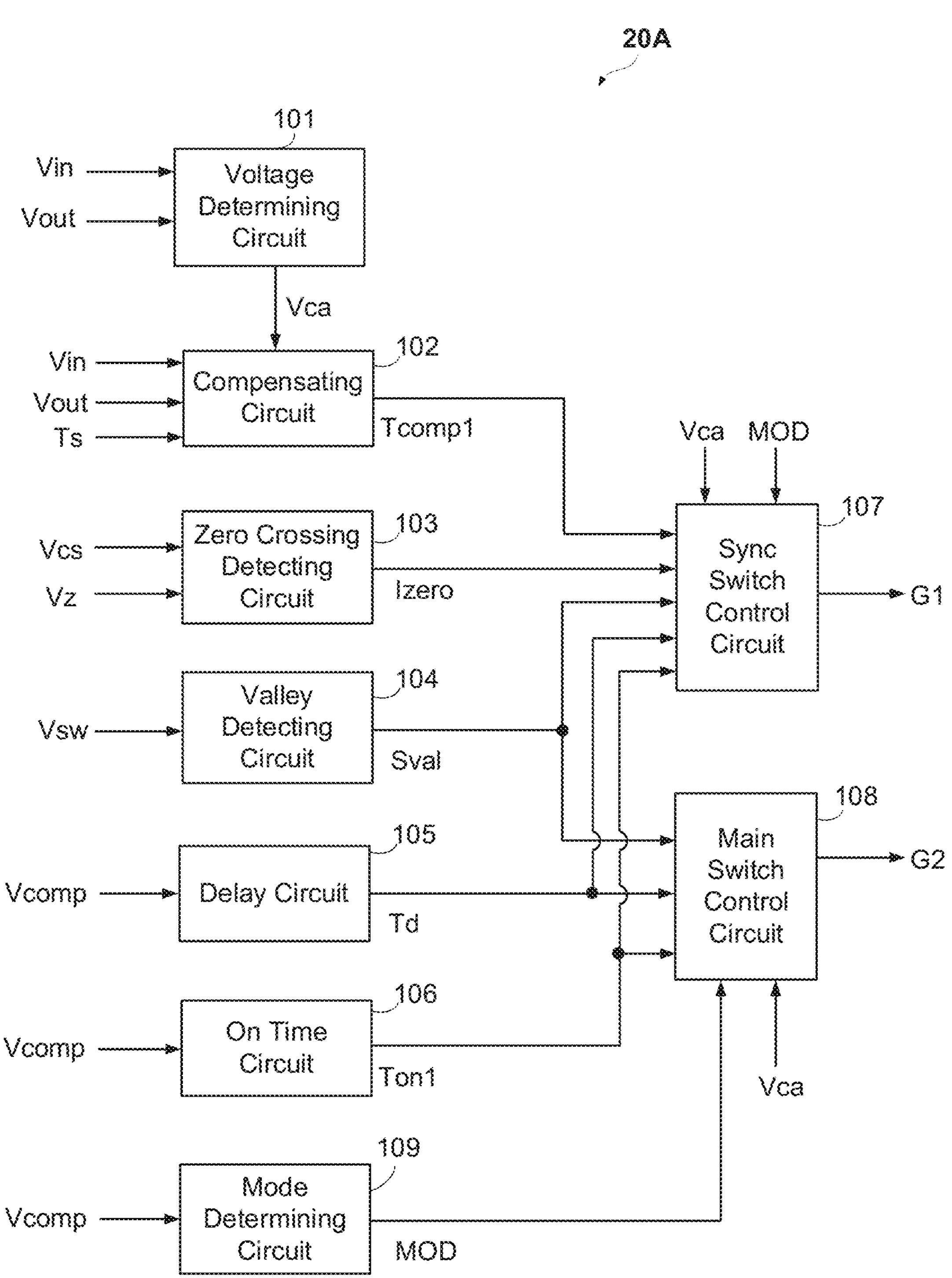
FIG. 3 illustrates a circuit schematic of a control circuit 20A used in the switching converter 100 in accordance with an embodiment of the present invention.

FIG. 3 illustrates a circuit schematic of a control circuit 20A used in the switching converter 100 in accordance with an embodiment of the present invention. As shown in FIG. 3, the control circuit 20A includes a voltage determining circuit 101, a compensating circuit 102, a zero crossing detecting circuit 103, a valley detecting circuit 104, a delay circuit 105, an on time circuit 106, a sync switch control circuit 107 and a main switch control circuit 108.

The voltage determining circuit 101 is configured to determine whether the AC input voltage Vin approaches the output voltage Vout and to generate a voltage determining signal Vca. In one embodiment, when the absolute value of the AC input voltage Vin is higher than a half of the output voltage Vout, i.e., |Vin|>Vout/2, the voltage determining signal Vca is in a first state indicating that the AC input voltage Vin approaches the output voltage Vout; when the absolute value of the AC input voltage Vin is lower than or equal to a half of the output voltage Vout, i.e., |Vin|<=Vout/2, the voltage determining signal Vca is in a second state indicating that the AC input voltage Vin is away from the output voltage Vout. Those skilled in the art can understand that the values of the output voltage Vout and the AC input voltage Vin can be obtained based on the first feedback voltage signal Vfb1 and the second feedback voltage signal Vfb2 respectively. In another embodiment, the voltage determining circuit 101 can also compare the first feedback voltage signal Vfb1 with the second feedback voltage signal Vfb2 to determine whether the AC input voltage Vin approaches the output voltage Vout.

The compensating circuit 102 is configured to generate a compensating signal Tcomp1 indicative of the first time period tcomp1 based on the AC input voltage Vin and the output voltage Vout. In one embodiment, after the main switch S2 and the sync switch S1 are both turned off, the inductor L1 and parasitic capacitor of the circuit start to resonate. The compensating circuit 102 is configured to generate the compensating signal Tcomp1 based on the AC input voltage Vin, the output voltage Vout, and the resonant cycle Ts of the voltage across the sync switch S1. Those skilled in the art can understand that the resonant cycle of the voltage across the main switch S2 is equal to the resonant cycle Ts of the voltage across the sync switch S1. The resonant cycle Ts can also be obtained by detecting the resonant cycle of the voltage across the main switch S2 (i.e., the switching voltage Vsw). Where the first time period tcomp1 can be expressed as:

$$t_{comp1} \geq \frac{T_s}{2\pi}\sqrt{\frac{V_{in}^2}{(V_o - V_{in})^2} - 1} \tag{1}$$

where $V_o$ is the output voltage, $V_{in}$ is the AC input voltage and $T_s$ is the resonant cycle.

As shown in FIG. 3, the compensating circuit 102 is further configured to receive the voltage determining signal Vca. When the voltage determining signal Vca indicates that the AC input voltage Vin approaches the output voltage Vout, the compensating circuit 102 is configured to get the first time period tcomp1 satisfying the formula (1). When the voltage determining signal Vca indicates that the AC input voltage Vin is away from the output voltage Vout, the compensating circuit 102 is configured to be disabled or to get the first time period tcomp1 to be equal to zero.

The zero crossing detecting circuit 103 is configured to compare the current sensing signal Vcs with a zero current threshold Vz and to generate a zero crossing detecting signal Izero indicating whether the inductor current IL decreases to zero. In one embodiment, the zero crossing detecting circuit 103 includes a comparator having a non-inverting input terminal, an inverting input terminal and an output terminal, where the non-inverting input terminal receives the zero current threshold Vz, the inverting input terminal receives the current sensing signal Vcs and the output terminal provides the zero crossing detecting signal Izero. When the current sensing signal Vcs decreases to the zero current threshold Vz, the zero crossing detecting signal Izero switches from logic low to logic high, indicating that the inductor current IL decreases to zero. In one embodiment, the value of the zero current threshold Vz is zero. In another embodiment, the value of the zero current threshold Vz approaches zero. For example, the zero current threshold Vz may be slightly higher than zero.

The valley detecting circuit 104 is configured to detect the slew rate of the switching voltage Vsw and to generate a valley detecting signal Sval indicative of a valley of the voltage across the main switch S2 and a valley of the voltage across the sync switch S1. In one embodiment, when the slew rate of the switching voltage Vsw is negative, the valley detecting signal Sval is logic high; otherwise, the valley detecting signal Sval is logic low. Then a rising edge of the valley detecting signal Sval indicates the valley of the voltage across the sync switch S1 and a falling edge of the valley detecting signal Sval indicates the valley of the voltage across the main switch S2.

The delay circuit 105 is configured to generate a delay signal Td indicative of a delay time period td based on a feedback regulation signal Vcomp. In one embodiment, when the feedback regulation signal Vcomp is lower than a first threshold Vcomp1, the delay time period td is higher than zero and decreases with the increase of the feedback regulation signal Vcomp; when the feedback regulation signal Vcomp is higher than the first threshold Vcomp1 and lower than a second threshold Vcomp2, the delay time period td is zero, where the second threshold Vcomp2 is a maximum value of the feedback regulation signal Vcomp. In another embodiment, when the feedback regulation signal Vcomp is higher than the first threshold Vcomp1 and lower than the second threshold Vcomp2, the delay circuit 105 is configured to be disabled.

The feedback regulation signal Vcomp can represent a load condition of the switching converter 100. In one embodiment, when the load becomes heavier, the feedback regulation signal Vcomp increases; when the load becomes lighter, the feedback regulation signal Vcomp decreases. In one embodiment, the feedback regulation signal Vcomp is an error amplifying signal between the first feedback voltage signal Vfb1 and a reference voltage signal. Those skilled in the art can understand that, however, these examples are for illustration purpose only and are not intended to limit the scope of the present invention.

The on time circuit 106 is configured to generate a first on time signal Ton1 to control an on time of the main switch S2 to be a first on time period ton1 based on the feedback regulation signal Vcomp. In one embodiment, when the feedback regulation signal Vcomp increases, the first on time period ton1 increases.

The sync switch control circuit 107 is configured to generate a sync switch control signal G1 to control the sync switch S1 based on the voltage determining signal Vca, the compensating signal Tcomp1, the zero crossing detecting signal Izero, the valley detecting signal Sval, the delay signal Td and the first on time signal Ton1.

The main switch control circuit 108 is configured to generate a main switch control signal G2 to control the main switch S2 based on the voltage determining signal Vca, the valley detecting signal Sval, the delay signal Td and the first on time signal Ton1.

In one embodiment, the control circuit 20A further includes a mode determining circuit 109. The mode determining circuit 109 is configured to generate a mode signal MOD indicating whether the switching converter 100 works in DCM (discontinuous conduction mode) or CRM (critical conduction mode). In one embodiment, the mode determining circuit 109 generates the mode signal MOD based on the feedback regulation signal Vcomp. When the feedback regulation signal Vcomp is lower than the first threshold Vcomp1, the mode signal MOD is in a first state indicating that the switching converter 100 works in DCM; when the feedback regulation signal Vcomp is higher than the first threshold Vcomp1 and lower than the second threshold Vcomp2, the mode signal MOD is in a second state indicating that the switching converter 100 works in CRM, where the second threshold Vcomp2 is the maximum value of the feedback regulation signal Vcomp.

The sync switch control circuit 107 and the main switch control circuit 108 are further configured to receive the mode signal MOD and to generate the sync switch control signal G1 and the main switch control signal G2 based thereupon respectively. In other embodiments, the mode determining circuit 109 can be omitted. The sync switch control circuit 107 and the main switch control circuit 108 determine whether the switching converter 100 works in DCM or CRM based on the delay signal Td directly. When the delay time period td is higher than zero, the switching converter 100 works in DCM; when the delay time period td is zero, the switching converter 100 works in CRM.

As mentioned above, during the positive half cycle of the AC input voltage Vin, when the voltage determining signal Vca indicates that the AC input voltage Vin approaches the output voltage Vout, the sync switch S1 is turned on for the additional first time period tcomp1 to generate a reverse current, thereby realizing the zero-voltage switching of the main switch S2. Next, the working principle of the switching converter 100 and the control circuit 20A when the AC input voltage Vin approaches to the output voltage Vout will be set forth with reference to the FIGS. 3~5.

Figure 4:
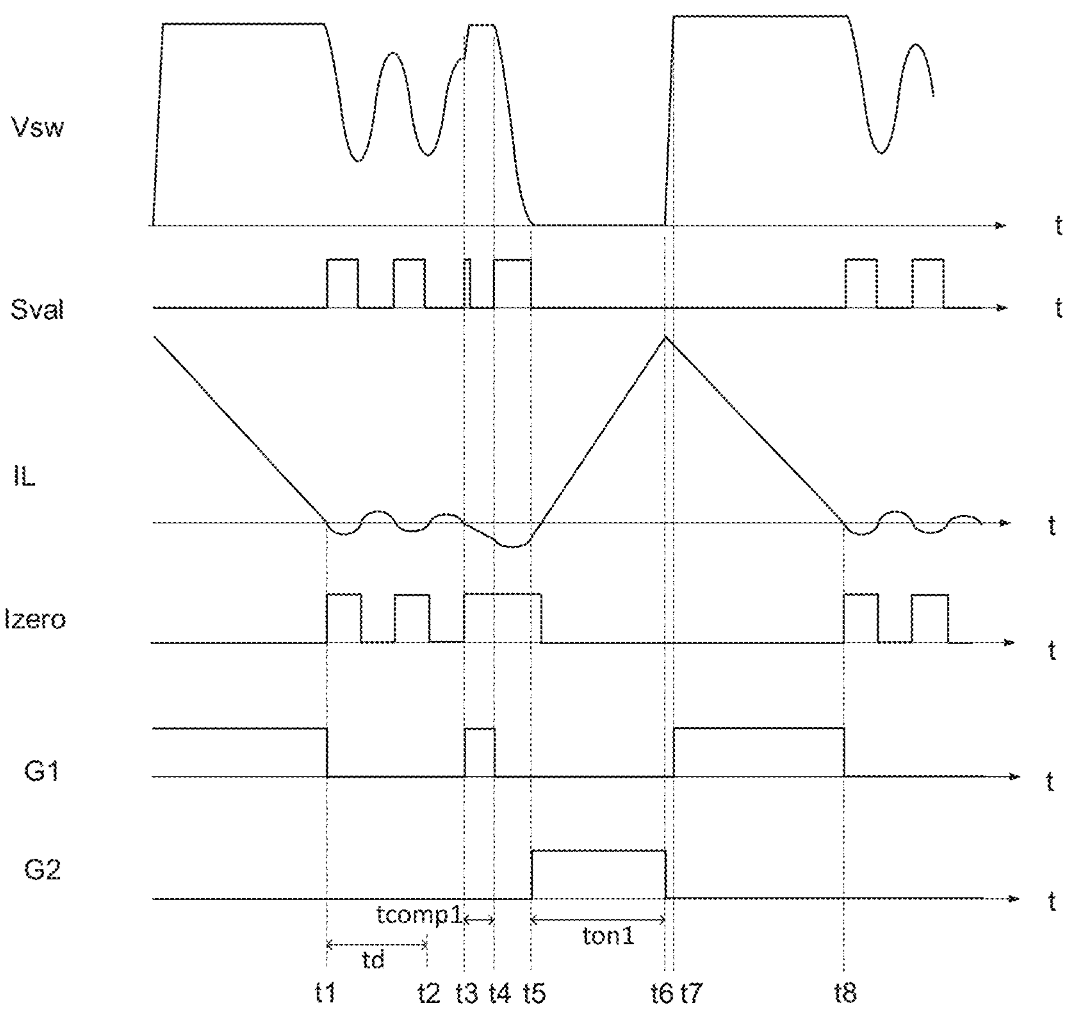
FIG. 4 illustrates working waveforms of the switching converter 100 working in DCM in accordance with an embodiment of the present invention.

FIG. 4 illustrates working waveforms of the switching converter 100 working in DCM in accordance with an embodiment of the present invention. As shown in FIG. 4, at time t1, a rising edge of the zero crossing detecting signal Izero comes, indicating that the inductor current IL decreases to zero. In response to the rising edge of the zero crossing detecting signal Izero, the sync switch control circuit 107 switches the sync switch control signal G1 from logic high to logic low to turn off the sync switch S1.

At time t2, the delay time period td started from the time when the sync switch S1 is turned off expires.

At time t3, a rising edge of the valley detecting signal Sval comes, indicating that a valley of the voltage across the sync switch S1 is detected. In response to the rising edge of the valley detecting signal Sval, the sync switch control circuit 107 switches the sync switch control signal G1 from logic low to logic high to turn on the sync switch S1.

At time t4, the on time of the sync switch S1 reaches the first time period tcomp1, the sync switch control circuit 107 switches the sync switch control signal G1 from logic high to logic low to turn off the sync switch S1 again.

At time t5, a falling edge of the valley detecting signal Sval comes, indicating that a valley of the voltage across the main switch S2 is detected. In response to the falling edge of the valley detecting signal Sval, the main switch control circuit 108 switches the main switch control signal G2 from logic low to logic high to turn on the main switch S2. As shown in FIG. 4, a reverse current of the inductor current IL is generated during time t4~t5, causing the voltage across the main switch S2 (i.e., the switching voltage Vsw) to decrease to zero at time t5. Thus, the zero-voltage turning-on of the main switch S2 is realized at time t5.

At time t6, the on time of the main switch S2 reaches the first on time period ton1, the main switch control circuit 108 switches the main switch control signal G2 from logic high to logic low to turn off the main switch S2. Then, the sync switch control circuit 107 switches the sync switch control signal G1 from logic low to logic high to turn on the sync switch S1. In the example shown in FIG. 4, in order to avoid shoot through, there is a delay started from the time the main switch S2 being turned off to the time the sync switch S1 being turned on. For example, the main switch S2 is turned off at time t6, while the sync switch S1 is turned on at time t7.

At time t8, a rising edge of the zero crossing detecting signal Izero comes, indicating that the inductor current IL decreases to zero, the sync switch S1 is turned off and the switching converter 100 enters next switching cycle.

Figure 5:
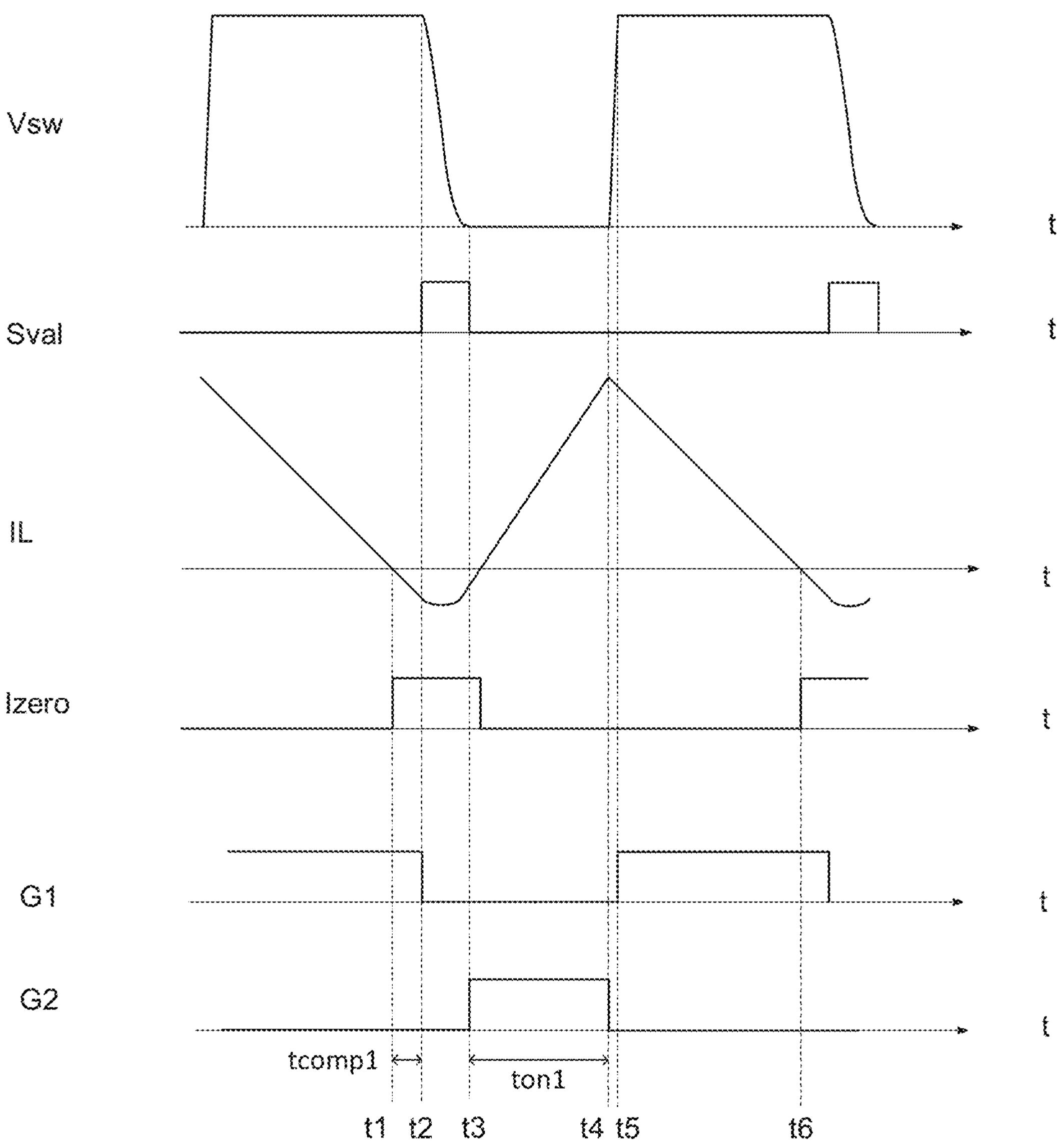
FIG. 5 illustrates working waveforms of the switching converter 100 working in CRM in accordance with an embodiment of the present invention.

FIG. 5 illustrates working waveforms of the switching converter 100 working in CRM in accordance with an embodiment of the present invention. As shown in FIG. 5, at time t1, a rising edge of the zero crossing detecting signal Izero comes, indicating that the inductor current IL decreases to zero. The sync switch control circuit 107 keeps the sync switch control signal G1 at logic high and the sync switch S1 keeps on.

At time t2, the first time period tcomp1 started from the time when the inductor current IL decreases to zero expires, the sync switch control circuit 107 switches the sync switch control signal G1 from logic high to logic low to turn off the sync switch S1.

At time t3, a falling edge of the valley detecting signal Sval comes, indicating that a valley of the voltage across the main switch S2 is detected. In response to the falling edge of the valley detecting signal Sval, the main switch control circuit 108 switches the main switch control signal G2 from logic low to logic high to turn on the main switch S2. As shown in FIG. 5, a reverse current of the inductor current IL is generated during time t2~t3, causing the voltage across the main switch S2 (i.e., the switching voltage Vsw) to decrease to zero at time t3. Thus, the zero-voltage turning-on of the main switch S2 is realized at time t3.

At time t4, the on time of the main switch S2 reaches the first on time period ton1, the main switch control circuit 108 switches the main switch control signal G2 from logic high to logic low to turn off the main switch S2. After a delay, at time t5, the sync switch control circuit 107 switches the sync switch control signal G1 from logic low to logic high to turn on the sync switch S1.

At time t6, a rising edge of the zero crossing detecting signal Izero comes, indicating that the inductor current IL decreases to zero, the switching converter 100 enters next switching cycle.

According to the embodiments of the present invention, the sync switch S1 is turned on for the additional first time period tcomp1 to generate a reverse current, thereby causing the voltage across the main switch S2 to decrease to zero. The switching converter 100 realizes the zero-voltage turning-on both in DCM and CRM. This can reduce the switching loss and improve efficiency of the switching converter 100.

Furthermore, in order to reduce the THD (total harmonic distortion) to reduce harmonic power loss, some embodiments of the present invention are further proposed to compensate the aforementioned reverse current.

Figure 6:
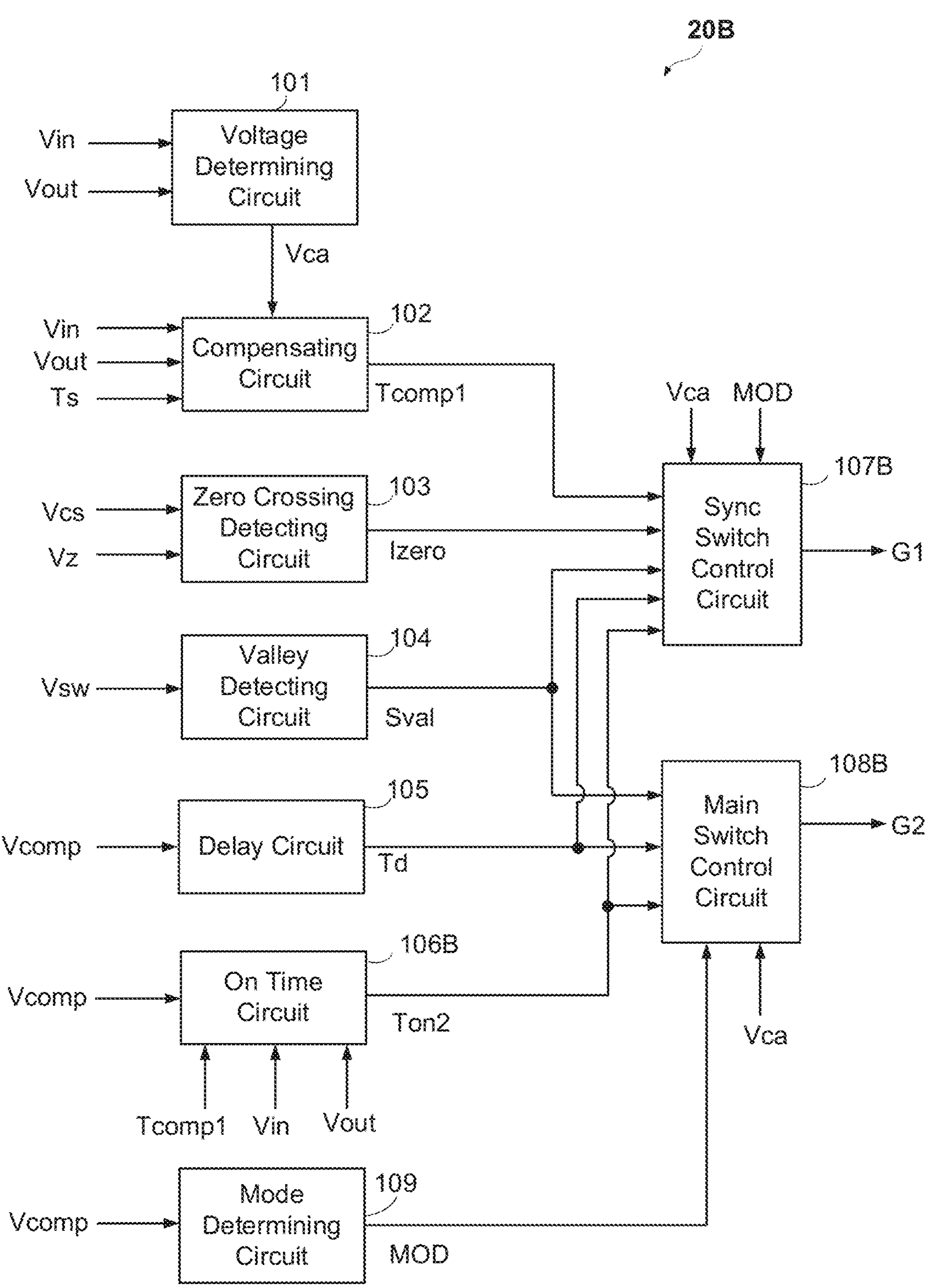
FIG. 6 illustrates a circuit schematic of a control circuit 20B used in the switching converter 100 in accordance with another embodiment of the present invention.

FIG. 6 illustrates a circuit schematic of a control circuit 20B used in the switching converter 100 in accordance with another embodiment of the present invention. Different from the control circuit 20A shown in FIG. 3, the on time circuit 106B in FIG. 6 is further configured to receive the AC input voltage Vin, the output voltage Vout and the compensating signal Tcomp1 and to generate a second on time signal Ton2 indicative of a second time period ton2 based on the AC input voltage Vin, the output voltage Vout, the compensating signal Tcomp1 and the feedback regulation signal Vcomp. Where the second time period ton2 is longer than the first on time period ton1 in the example shown in FIG. 3.

The main control circuit 108B is configured to receive the second on time signal Ton2 and to control the on time of the main switch S2 to be the second time period ton2. The on time of the main switch S2 is controlled to be prolonged to increase a forward current of the inductor current IL, thereby compensating the aforementioned reverse current.

Figure 7:
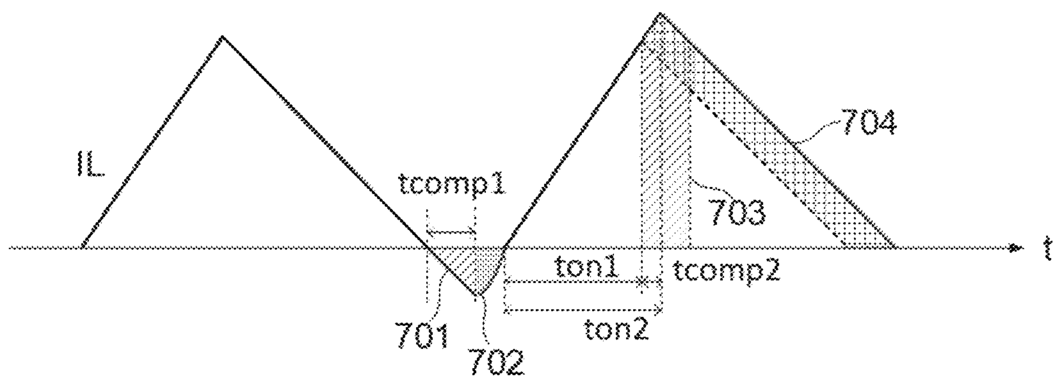
FIG. 7 illustrates a schematic diagram of THD compensation in accordance with an embodiment of the present invention.

FIG. 7 illustrates a schematic diagram of THD compensation in accordance with an embodiment of the present invention. As shown in FIG. 7, the on time of the main switch S2 is prolonged form ton1 to ton2, thus the forward current of the inductor current IL is increased. In order to counteract the influence of the reverse current, an area $S_{pos}$ of the increased forward current region 704 is required to be equal to a total area $S_{neg}$ of the reverse current regions 701 and 702, then the second time period ton2 can be derived.

The area $S_1$ of the reverse current region 701 can be represented as:

$$S_1 = \frac{V_o - V_{in}}{2L} t_{comp1}^2 \tag{2}$$

The total area $S_{neg}$ of the reverse current regions 701 and 702 can be estimated by a proportional coefficient k:

$$S_{neg} = k\frac{V_o - V_{in}}{L} t_{comp1}^2 \tag{3}$$

where the proportional coefficient k can be set and adjusted based on practical application.

The area $S_{pos}$ of the increased forward current region 704 can be approximated by the area of the region 703 and can be expressed as:

$$S_{pos} = \frac{V_o V_{in}}{L(V_o - V_{in})} t_{on1} t_{comp2} \tag{4}$$

Let $S_{pos}=S_{neg}$, then the time tcomp2 is:

$$t_{comp2} = k\frac{(V_o - V_{in})^2}{V_o V_{in} t_{on1}} t_{comp1}^2 \tag{5}$$

The second time period ton2 can be expressed as:

$$t_{on2} = t_{on1} + k\frac{(V_o - V_{in})^2}{V_o V_{in} t_{on1}} t_{comp1}^2 \tag{6}$$

In one embodiment, the second time period ton2 generated by the on time circuit 106B shown in FIG. 6 satisfies the formula (6), where ton1 is related to the feedback regulation signal Vcomp.

Figure 8:
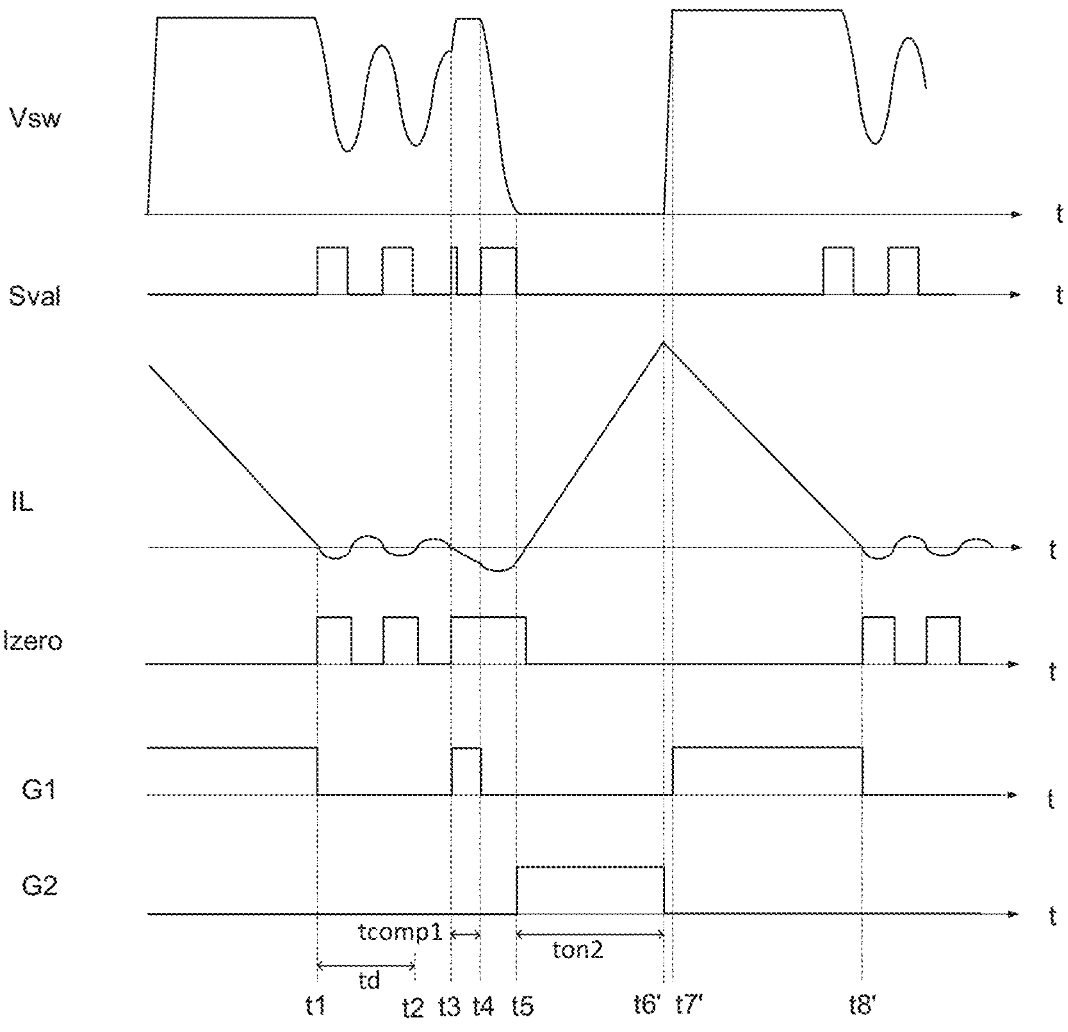
FIG. 8 illustrates working waveforms of the switching converter 100 working in DCM in accordance with another embodiment of the present invention.

FIG. 8 illustrates working waveforms of the switching converter 100 working in DCM in accordance with another embodiment of the present invention. Different from the working waveforms shown in FIG. 4, at time t6', the on time of the main switch S2 reaches the second time period ton2, the main switch control circuit 108B switches the main switch control signal G2 from logic high to logic low to turn off the main switch S2.

Figure 9:
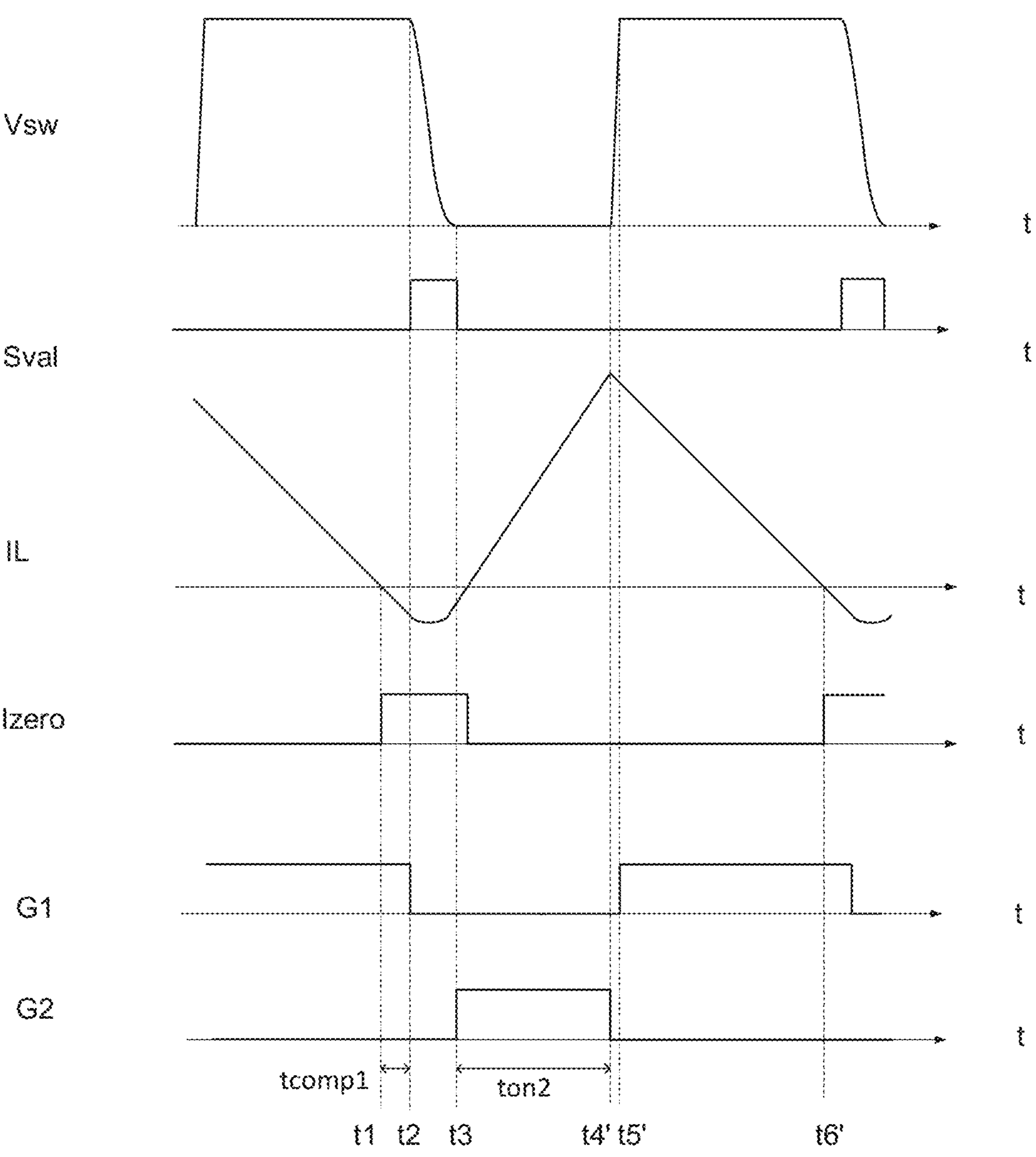
FIG. 9 illustrates working waveforms of the switching converter 100 working in CRM in accordance with another embodiment of the present invention.

FIG. 9 illustrates working waveforms of the switching converter 100 working in CRM in accordance with another embodiment of the present invention. Different from the working waveforms shown in FIG. 5, at time t4', the on time of the main switch S2 reaches the second time period ton2, the main switch control circuit 108B switches the main switch control signal G2 from logic high to logic low to turn off the main switch S2.

In the examples shown in FIGS. 6~9, the on time of the main switch S2 are prolonged to the second time period ton2 and thus the reverse current can be compensated by the increased forward current. This can reduce the THD of the switching converter 100.

Those skilled in the art can understand that the direction of the inductor current IL is negative when the AC input voltage Vin is in the negative half cycle. The inductor current IL decrease to zero also includes the situation where the absolute value of the inductor current IL with negative direction decreases to zero. The power switches S1~S4 of the switching converter 100 may be any controllable semiconductor device, such as BJT, JFET, MOSFET, IGBT, GaNFET and so on. In one embodiment, the third power switch S3 and the fourth power switch S4 can be replaced by diodes.

Those skilled in the art can understand that the switching converter 100 can be configured in any suitable topology. In one embodiment, the switching converter 100 may include a rectifying circuit and a BOOST circuit. The BOOST circuit includes a high side power switch and a low side power switch coupled between an output node and a reference ground, where the low side power switch is the main switch and the high side power switch is the sync switch.

Those skilled in the art can understand that the circuits shown in the above embodiments are exemplary illustrations, other suitable circuits can also be applicable. In one embodiment, the control circuit can be digital circuit. The working principle of the control circuit can be described by digital language such as VHDL and Verilog, thereby generating digital circuits to realize the functions of the control circuit. The main switch control circuit and the sync switch control circuit can be realized by state machine.

Figure 10:
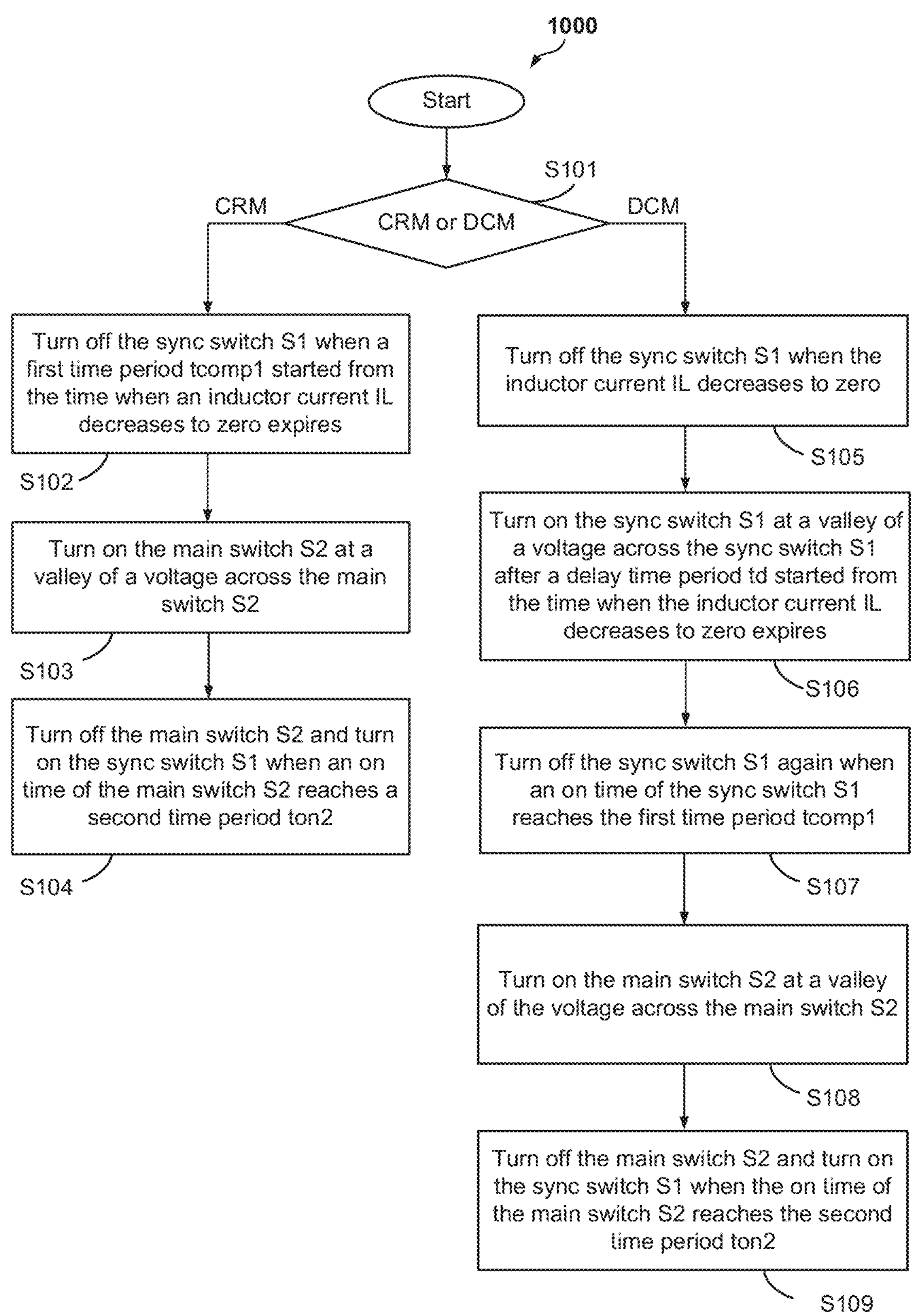
FIG. 10 illustrates a flowchart of a control method 1000 used in the switching converter 100 in accordance with an embodiment of the present invention.

FIG. 10 illustrates a flowchart of a control method 1000 used in the switching converter 100 in accordance with an embodiment of the present invention. The switching converter 100 includes a main switch S2 and a sync switch S1. The control method includes steps S101~S109.

At step S101, whether the switching converter 100 works in CRM or DCM is determined. If the switching converter 100 works in CRM, go to step S102; if the switching converter 100 works in DCM, go to step S105.

At step S102, the sync switch S1 is turned off when a first time period tcomp1 started from the time when an inductor current IL decreases to zero expires.

At step S103, the main switch S2 is turned on at a valley of a voltage across the main switch S2 after the sync switch S1 is turned off.

At step S104, the main switch S2 is turned off and the sync switch S1 is turned on when an on time of the main switch S2 reaches a second time period ton2. In one embodiment, in order to avoid shoot through, there is a delay started from the time the main switch S2 being turned off to the time the sync switch S1 being turned on.

At step S105, the sync switch S1 is turned off when the inductor current IL decreases to zero.

At step S106, after a delay time period td started from the time when the inductor current IL decreases to zero expires, the sync switch S1 is turned on at a valley of a voltage across the sync switch S1.

At step S107, the sync switch S1 is turned off again when an on time of the sync switch S1 reaches the first time period tcomp1.

At step S108, after the sync switch S1 is turned off again, the main switch S2 is turned on at a valley of the voltage across the main switch S2.

At step S109, the main switch S2 is turned off and the sync switch S1 is turned on when the on time of the main switch S2 reaches the second time period ton2. In one embodiment, there is a delay started from the time the main switch S2 being turned off to the time the sync switch S1 being turned on.

Those skilled in the art can understand that, in the flowchart described above, the steps may also be performed in an order different from the order shown as FIG. 10.

Those skilled in the art can understand that the logic high/logic low of the switch control signal is related to the type of the power switches. For example, if the power switch is N-type MOSFET, when the control signal is logic high, the power switch is turned on; when the control signal is logic low, the power switch is turned off. If the power switch is P-type MOSFET, when the control signal is logic high, the power switch is turned off; when the control signal is logic low, the power switch is turned on. The logic high/logic low of the control signals shown in the above embodiments are used for illustrative purposes, not used for limiting the present invention.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Obviously, many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. A control circuit for a switching converter with a main switch and a sync switch and converting an AC (alternating current) input voltage into an output voltage, the control circuit comprising:

a compensating circuit configured to generate a compensating signal indicative of a first time period; and a sync switch control circuit configured to generate a sync switch control signal to control the sync switch based on the compensating signal; wherein when the switching converter works in DCM (discontinuous conduction mode), the sync switch control circuit is configured to:

turn off the sync switch when an inductor current decreases to zero;

turn on the sync switch at a valley of a voltage across the sync switch; and turn off the sync switch again when an on time of the sync switch reaches the first time period.

2. The control circuit of claim 1, wherein the compensating circuit is configured to generate the compensating signal based on the AC input voltage, the output voltage and a resonant cycle of the voltage across the sync switch.

3. The control circuit of claim 1, wherein the sync switch is configured to be turned on at the valley of the voltage across the sync switch after a delay time period started from the time when the inductor current decreases to zero expires.

4. The control circuit of claim 1, further comprising:

when the switching converter works in CRM (critical conduction mode), the sync switch control circuit is configured to turn off the sync switch when the first time period started from the time when the inductor current decreases to zero expires.

5. The control circuit of claim 1, further comprising:

an on time circuit configured to generate an on time signal indicative of a second time period; and a main switch control circuit configured to generate a main switch control signal to control the main switch based on the on time signal; wherein the main switch control circuit is configured to turn on the main switch at a valley of a voltage across the main switch and to turn off the main switch when an on time of the main switch reaches the second time period.

6. The control circuit of claim 5, wherein the on time circuit is configured to generate the on time signal based on the AC input voltage, the output voltage, the first time period and a load condition.

7. The control circuit of claim 1, further comprising:

a voltage determining circuit configured to determine whether the AC input voltage approaches the output voltage and to generate a voltage determining signal, wherein the sync switch control circuit is further configured to generate the sync switch control signal based on the voltage determining signal.

8. The control circuit of claim 1, further comprising:

a valley detecting circuit configured to detect a slew rate of a voltage at a common connection node of the sync switch and the main switch and to generate a valley detecting signal indicative of a valley of the voltage across the sync switch and a valley of a voltage across the main switch.

9. The control circuit of claim 1, further comprising:

a zero crossing detecting circuit configured to compare a current sensing signal indicative of the inductor current with a zero current threshold and to generate a zero crossing detecting signal indicating that the inductor current decreases to zero.

10. A switching converter for converting an AC input voltage into an output voltage, comprising:

a first power switch coupled between an output node and a switching node;

a second power switch coupled between the switching node and a reference ground;

an inductor coupled between a first input node and the switching node;

a third power switch coupled between a second input node and the reference ground;

a fourth power switch coupled between the output node and the second input node;

a sync switch control circuit configured to generate a sync switch control signal to control a sync switch; wherein when the switching converter works in DCM, the sync switch control circuit is configured to:

turn off the sync switch when an inductor current decreases to zero;

turn on the sync switch at a valley of a voltage across the sync switch; and turn off the sync switch again when an on time of the sync switch reaches a first time period; wherein when the AC input voltage is in a positive half cycle, the first power switch is the sync switch; and wherein when the AC input voltage is in a negative half cycle, the second power switch is the sync switch.

11. The switching converter of claim 10, further comprising:

a compensating circuit configured to generate a compensating signal indicative of the first time period based on the AC input voltage, the output voltage and a resonant cycle of the voltage across the sync switch.

12. The switching converter of claim 10, wherein:

when the switching converter works in CRM, the sync switch control circuit is configured to turn off the sync switch when the first time period started from the time when the inductor current decreases to zero expires.

13. The switching converter of claim 10, further comprising:

a main switch control circuit configured to generate a main switch control signal to control a main switch, wherein the main switch control circuit is configured to turn on the main switch at a valley of a voltage across the main switch and to turn off the main switch when an on time of the main switch reaches a second time period; wherein when the AC input voltage is in the positive half cycle, the second power switch is the main switch; and wherein when the AC input voltage is in the negative half cycle, the first power switch is the main switch.

14. The switching converter of claim 13, further comprising:

an on time circuit configured to generate an on time signal indicative of the second time period based on the AC input voltage, the output voltage, the first time period and a load condition.

15. The switching converter of claim 10, further comprising:

a voltage determining circuit configured to determine whether the AC input voltage approaches the output voltage and to generate a voltage determining signal, wherein the sync switch control circuit is further configured to generate the sync switch control signal based on the voltage determining signal.

16. The switching converter of claim 10, further comprising:

a valley detecting circuit configured to detect a slew rate of a voltage at the switching node and to generate a valley detecting signal indicative of a valley of a voltage across the main switch and a valley of the voltage across the sync switch.

17. A control method for a switching converter with a main switch and a sync switch and converting an AC input voltage into an output voltage, the control method comprising:

determining whether the switching converter works in DCM or CRM;

when the switching converter works in CRM, turning off the sync switch when a first time period started from the time when an inductor current decreases to zero expires;

turning on the main switch at a valley of a voltage across the main switch; and turning off the main switch when an on time of the main switch reaches a second time period, wherein the second time period is related to the first time period.

18. The control method of claim 17, wherein the second time period is further related to the AC input voltage, the output voltage and a load condition of the switching converter.

19. The control method of claim 17, wherein the first time period is related to the AC input voltage, the output voltage and a resonant cycle of a voltage across the sync switch.

20. The control method of claim 17, further comprising:

when the switching converter works in DCM, turning off the sync switch when the inductor current decreases to zero;

turning on the sync switch at a valley of a voltage across the sync switch;

turning off the sync switch again when an on time of the sync switch reaches the first time period;

turning on the main switch at a valley of the voltage across the main switch; and turning off the main switch when the on time of the main switch reaches the second time period.

* * * * *